(12) United States Patent
Wenger et al.

(10) Patent No.: US 7,131,507 B2
(45) Date of Patent: Nov. 7, 2006

(54) TRACKED ATV

(75) Inventors: Urs Wenger, Rumisberg (CH); Beat Kohler, Kirchberg (CH); Hans-Rudolf Jenni, Grasswil (CH)

(73) Assignee: Wenko AG Burgdorf (CH)

( * ) Notice: Subject to any disclaimer, the term of this patent is extended or adjusted under 35 U.S.C. 154(b) by 0 days.

(21) Appl. No.: 11/035,925

(22) Filed: Jan. 14, 2005

(65) Prior Publication Data
US 2006/0157290 A1    Jul. 20, 2006

(51) Int. Cl.
B62D 55/06    (2006.01)
(52) U.S. Cl. .................. 180/6.7; 180/9.54
(58) Field of Classification Search ............ 180/6.2, 180/6.7, 9.1, 9.5, 9.54
See application file for complete search history.

(56) References Cited

U.S. PATENT DOCUMENTS

| | | | | |
|---|---|---|---|---|
| 2,373,316 A | * | 4/1945 | Landy ................ | 180/6.54 |
| 2,656,904 A | * | 10/1953 | Grenier ............... | 192/17 R |
| 3,385,255 A | * | 5/1968 | Raymond et al. ...... | 440/12.56 |
| 3,698,500 A | * | 10/1972 | Jernigan .............. | 180/6.7 |
| 3,771,616 A | * | 11/1973 | Parodi ................ | 180/6.7 |
| 3,776,325 A | * | 12/1973 | Jespersen ............. | 180/6.48 |
| 4,671,774 A | * | 6/1987 | Owsen ................ | 440/95 |
| 5,305,846 A | * | 4/1994 | Martin ................ | 180/181 |
| 2004/0159475 A1 | * | 8/2004 | Moor, Jr. ............. | 180/9.44 |

FOREIGN PATENT DOCUMENTS

| | | | |
|---|---|---|---|
| CA | 2141777 A | * | 8/1996 |
| DE | 717 514 | | 2/1942 |

* cited by examiner

*Primary Examiner*—Kevin Hurley
(74) *Attorney, Agent, or Firm*—Ostrolenk, Faber, Gerb & Soffen, LLP

(57) ABSTRACT

The invention relates to a tracked ATV which is fully supported, driven and steered by a pair of parallel endless tracks driven by means of an internal combustion engine. Steering means are arranged to control the differential speed between the tracks for steering the vehicle. A handlebar is pivotally mounted to a vehicle body in front of a driver seat and the steering means are arranged to be operated by rotation of the handlebar. According to another aspect of the invention the driver seat is a straddle-type seat and footrests are arranged on the body to the left and to the right of this seat, which footrests are situated vertically in between an upper run and a ground engaging lower run of the tracks.

30 Claims, 2 Drawing Sheets

TRACKED ATV

BACKGROUND OF THE INVENTION

The invention relates to a tracked ATV. The term All Terrain Vehicle (ATV) designates in the following text vehicles for off-road use which have a relatively small footprint and are intended for use by a driver alone or for a driver and one passenger.

A general distinction is to be made between wheeled and tracked ATVs: A wheeled ATV usually has four wheels, a straddle-type seat for a driver and a handlebar for the steering of the front wheels. Its driver can ride it actively, adapting his position on the seat and hence the balance of the vehicle to a particular driving situation. This allows high driving speeds in off-road conditions. However, wheel drives are not sufficient for universal off-road use, since they lack grip or tend to sink on soft grounds or in deep snow for example.

For use on soft grounds, a tracked ATV is perfect since its ground force is distributed over the ground engaging portion of the tracks and therefore greatly reduced. A track conversion kit for a wheeled ATV is described in the Canadian patent application CA-2,374,657, but the best ground engagement and ground force distribution is offered by full-track vehicles.

The Canadian patent application CA-2,141,777 describes such a full-track ATV. It has a pair of parallel, ground engaging tracks and a joystick allows the driver to control the differential speed between the two tracks for steering the vehicle. A driver seat of the type known from cars gives the driver a stable position with respect to the joystick which is arranged in front of him. However, with this type of steering control (the joystick) and the driving posture given due to the type and position of the seat, it is impossible for the driver to move spontaneously in order to improve the balance of the vehicle with respect to a particular driving situation.

SUMMARY OF THE INVENTION

It is an object of the present invention to provide a tracked ATV which allows movements of its driver in order to adapt the balance of the vehicle with respect to a particular driving situation.

According to one aspect of the invention, a tracked ATV comprises a vehicle body, a pair of ground engaging endless tracks fully supporting the vehicle body, an internal combustion engine for driving the tracks, a driver seat supported on the vehicle body, as well as speed control means and steering means allowing a driver to control the common and differential speed of the tracks for speed control and steering of the vehicle, respectively. A handlebar is pivotally mounted to the body in front of the driver seat, the steering means are arranged to be operated by rotation of this handlebar and the speed control means are arranged on the handlebar for manual speed control of the vehicle by the driver.

According to another aspect of the invention, a tracked ATV comprises a vehicle body, a pair of ground engaging endless tracks fully supporting the vehicle body, an internal combustion engine for driving the tracks, a driver seat supported on the vehicle body, as well as speed control means and steering means allowing a driver to control the common and differential speed of the tracks for speed control and steering of the vehicle, respectively. The driver seat is a straddle-type seat and footrests for the feet of the driver are arranged to the left and to the right of this seat, in positions between the two tracks and vertically between an upper run and a lower, ground engaging run of the tracks.

The invention will be described in detail hereinafter with reference to the drawings illustrating an exemplary embodiment thereof.

DESCRIPTION OF A PREFERRED EMBODIMENT

Figure 1:
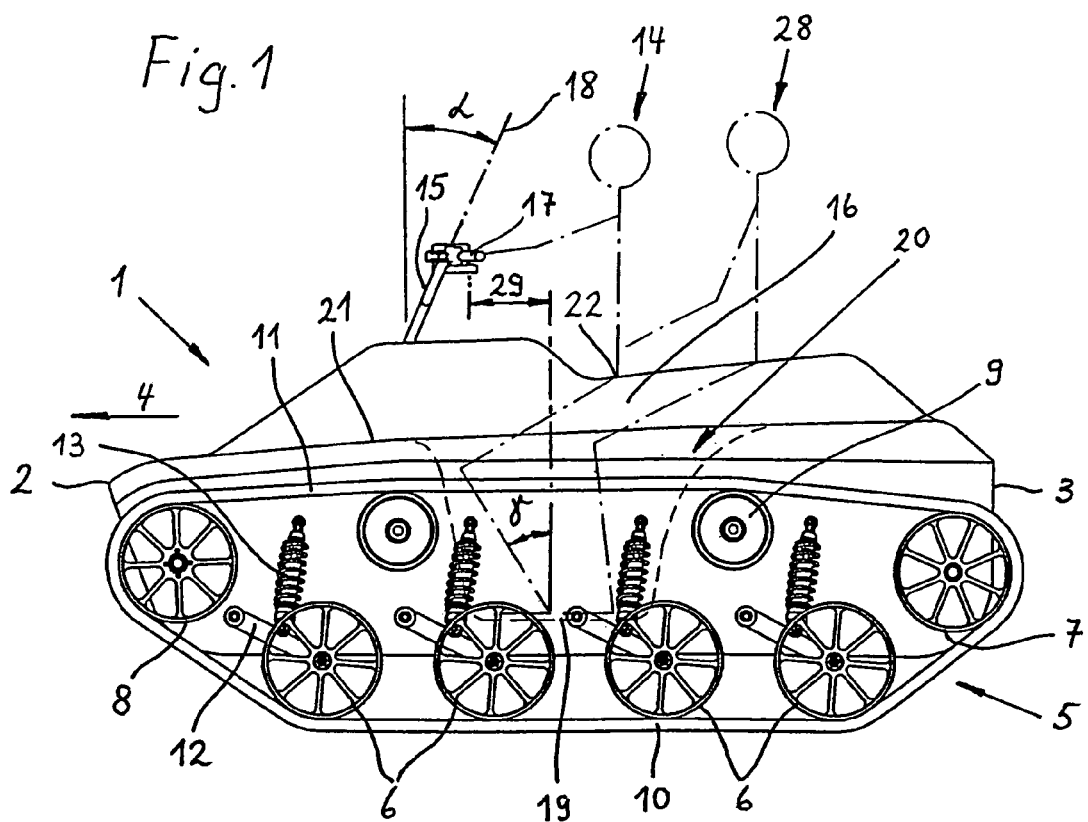
FIG. 1 shows a simplified side view of a tracked ATV.

The tracked ATV shown in side view in FIG. 1 has a vehicle body 1 with a front end 2 and a rear end 3. The direction from the rear end 2 towards the front end 2 indicates its straight direction of travel 4. The vehicle has a pair of parallel endless tracks 5, only the left one of which is visible in this view. These tracks are mounted around track wheels comprising carrying wheels 6, a drive wheel 7, a tensioning wheel 8 and support wheels 9. The carrying wheels 6 are engaged with an inner surface of a lower run 10 of the tracks 5 and fully support the vehicle body 1, while the support wheels support an upper run 11 of the tracks.

The use of separate wheels 6, 9, respectively engaged with the lower and the upper run 10, 11 of the tracks, makes it possible to use a resilient suspension of the carrying wheels allowing a long vertical excursion of these wheels of preferably 10 cm at least. In this example, each of the carrying wheels 6 is mounted to an individual swing arm 12 which is pivotally connected to the body 1 and supported in an inclined position by a shock absorber 13. This suspension system absorbs shocks from bumpy ground even at high driving speeds.

The drive wheels 5 are operably connected to an internal combustion engine for driving the tracks. Further details about this drive system are given with reference to FIG. 4 hereinafter. The steering of the vehicle is possible through the control of the differential speed between its left track and its right track, there is no pivoting carrying element engaged with the ground, such as the front wheels of a wheeled ATV or the front skis of a snowmobile, which are usually connected to a pivoting handlebar for steering. However, the inventor has found that such a handlebar 15, arranged on a full-track ATV to be used by its driver much like the handlebar of a wheeled ATV, allows superior handling of the vehicle than the joysticks which have previously been used.

A driver seat 16 is supported on the body and a handlebar 15 is mounted to the body in front of the driver seat 16. This handlebar 15 is the steering control of the vehicle: It is operably connected to the tracks and arranged to control the differential speed of the same for steering the vehicle. The steering action may imply positive or negative acceleration of one track only, or acceleration of both tracks in opposite directions. The handlebar 15 is pivotally mounted to the body and arranged to be turned left or right for left or right steering respectively. The connection between the handlebar and the tracks may comprise mechanical, electrical or hydraulic components, or various combinations of these technologies, depending in particular on the technology which is used to drive the tracks. The handlebar is arranged to be turned left or right by the driver in order to command a left or a right turn of the vehicle respectively.

Compared to a joystick one advantage of the handlebar is that it has a handle 17 at each of its ends and these handles 17 are substantially on opposite sides of its pivoting axis, which makes it easy to transmit forces to the vehicle body by acting on both handles simultaneously, without causing a rotation of the handlebar.

While driving, the hands of the driver rest on the handles of the handlebar and lateral movements of the driver's torso may cause vertical forces of varying strength acting on each of the handles, which are not intended as steering commands. This is even more the case if the driver takes a standing driving posture. A steering effect of vertical forces onto the handles should therefore be avoided. A handlebar is inert to vertical forces if its pivoting axis is vertical. However, an inclination of this pivoting axis towards the driver seat has the advantage that the handle's distance from the driver varies less due to a rotation of the handlebar. For these reasons, the pivoting axis of the handlebar is preferably inclined with respect to a vertical line by an angle $\alpha$ between 0 and 40°.

Where reference is made to a vertical or horizontal orientation, it is supposed that the vehicle stands on a horizontal ground.

The handlebar is shaped in such a way that in its middle position, when it is neither turned to the left nor to the right, its handles are oriented substantially in parallel with a horizontal plane and slightly inclined with respect to one another by an angle $\beta$, so that their free ends point towards the rear end of the vehicle body. The advantage of this shape is that when holding the handles, the driver's hands and forearms are in line, and this both in a standing and sitting driving posture. The optimal angle $\beta$ between the handles depends on the distance between the handles. Handlebars of the size and shape known from wheeled ATV's are preferably used. Handlebars with a width of at least 0.5 m between the outer ends of the handles allow a fairly good handling of the vehicle, but handlebars with a width of at least 0.7 m are preferably used. The angle of inclination $\beta$ between the handles should be such that the driver's forearms are substantially at a right angle with the respective handle. However, a straight handlebar with exactly parallel handles may also be used, for instance.

The steering means presented hereinbefore is a pivoting handlebar arranged to be operated by turning it left or right, much like the handlebar of a four wheel ATV. However, the handlebar could also be mounted differently or individual handles for the left and right hands of the driver could be arranged on the body, preferably in positions corresponding to the positions of the handles of the pivoting handlebar in its neutral position.

Speed control means 30, operably connected to the tracks for the control of their common speed, which is the travel speed of the vehicle, are arranged on the handlebar as well (not represented in the figures). A rotatable grip like the throttle grip of a motorbike or a throttle lever arranged to be operated with the thumb of one of the driver's hands, as known from wheeled ATV's, are possible examples.

The tracked ATV is further provided with a brake system comprising brake control means 31 such as a brake lever, which are arranged on the handlebar as well, enabling the driver to brake the vehicle with at least one of his hands. This concentration of important controls for driving the vehicle on the handlebar gives a driver maximum freedom to adapt his posture to a particular driving situation at any time.

The driver seat 16 is a straddle-type seat and footrests 19 for the feet of the driver are arranged to the left and to the right of this driver seat 16. This configuration gives the driver sufficient hold while allowing movements of the driver's torso. In the straight direction of travel 4, the footrests 19 are arranged in such a position that the ankles of the driver are at a distance 29 behind the handlebar, allowing him to take a comfortable standing driving posture and to change between a standing and a sitting driving posture without moving his feet. The position of the footrests 19 with respect to an intended sitting position 22 on the driver seat is preferably such that the lower leg of the driver is inclined with respect to a vertical line by an angle $\chi$, his knees being closer to the front end 2 of the vehicle body than his ankles. This allows him to stand up easily.

In this example, the seat 16 extends towards the rear of the vehicle and is long enough to accommodate a passenger 28 behind the driver. The footrests 19 are long enough to accommodate the feet of the passenger 28 behind the feet of the driver 14 as well.

Figure 2:
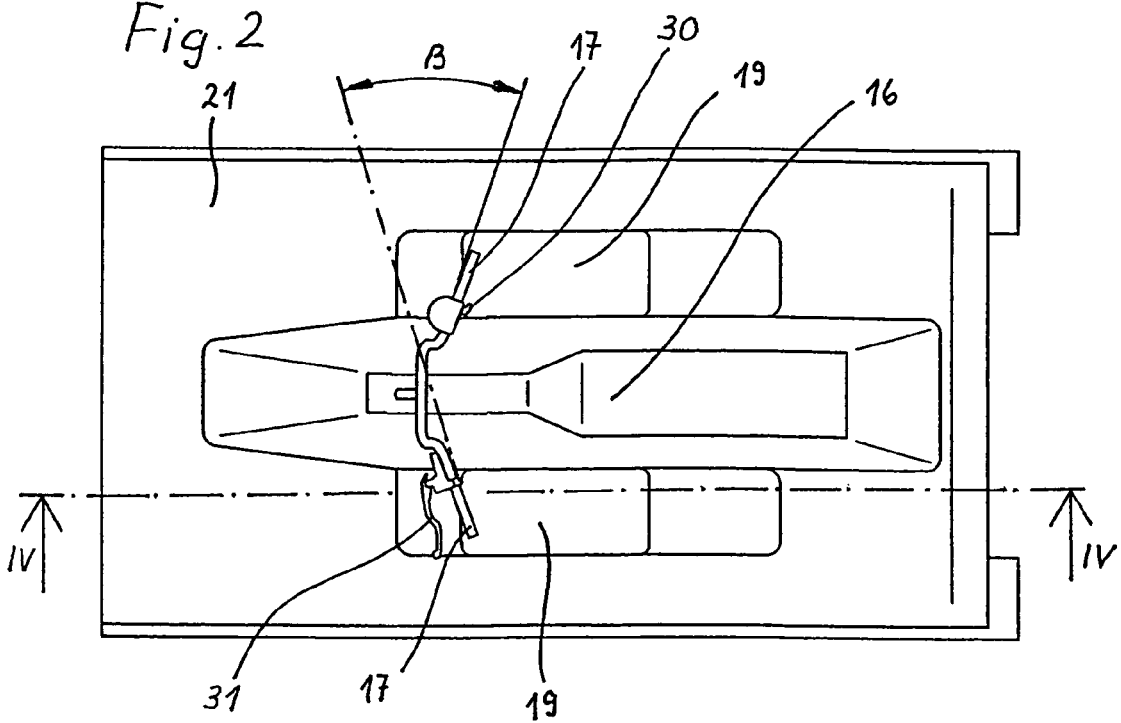
FIG. 2 shows a simplified elevational view of the vehicle of FIG. 1.

A footrest may be any surface on which a driver can place his foot. The position of the footrests in the present example is more readily apparent from FIG. 2, showing the top view of the same vehicle. The body comprises a watertight hull, a lower portion of which is situated between the two tracks. This hull has a substantially closed deck 21, which keeps water out of the hull when the vehicle is exposed to rain. Each of the footrests 19 is arranged in a corresponding recess in the deck 21 and situated vertically in between the lower run 10 and the upper run 11 of the tracks. This low position of the footrests allows to place the driver seat relatively low as well, contributing to a low center of gravity of the whole unit consisting of the vehicle and its driver.

For off-road driving the weight distribution is considered to be optimal if the center of gravity of the vehicle and of its driver are both perpendicularly above the center of gravity of the vehicle's footprint. The footprint is the surface on which the vehicle stands, it consists of the surface of the lower, ground engaging runs 10 of the two tracks. In the straight direction of travel the center of gravity of this footprint is in the middle of the lower runs of the tracks. Therefore the driver seat is preferably arranged in a position where, in the straight direction of travel, the deviation of the intended sitting position of the driver on this seat from the middle of the lower runs 10 does not exceed 30% of their length.

The possibility of the driver to influence with his movements the balance of the vehicle also depends on the footprint and on the total weight of the vehicle. The smaller its footprint and the lower its weight, the more can its balance be affected by movements of the driver. Preferably the length of the lower runs 10 of the tracks 5 does not exceed 2 m and the unfuled weight of the vehicle does not exceed 450 kg.

Figure 3:
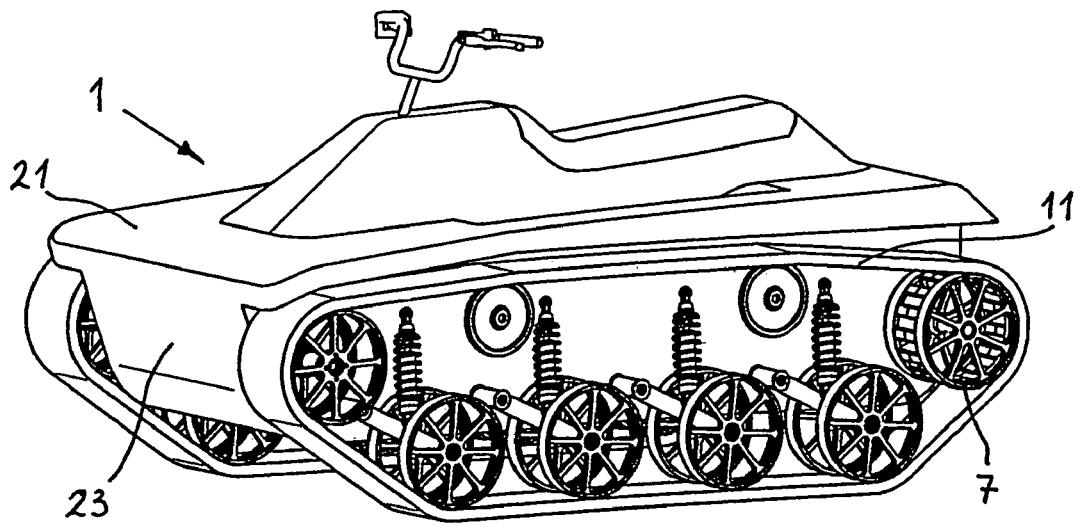
FIG. 3 shows a simplified perspective view of the vehicle of FIG. 1.

In FIG. 3 the same vehicle is shown in a perspective view, in which the shape of the vehicle body 1 with the watertight hull 23 and the deck 21 are more readily apparent. The volume of this watertight hull 23 is sufficient for the vehicle to swim in water. The upper runs 11 of the tracks of the swimming vehicle are above the water surface, so that the tracks can propel the swimming vehicle as well.

Figure 4:
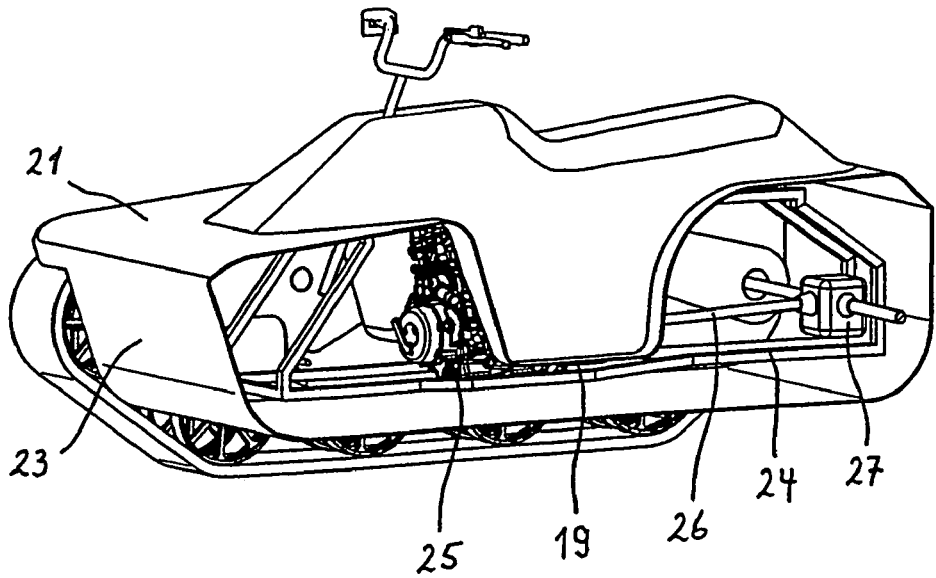
FIG. 4 shows a perspective view into the body of the same vehicle, according to line IV—IV in FIG. 2.

FIG. 4 shows the same vehicle in a sectional perspective view, where the hull 23 and the deck 21 of the body are cut open according to the plane IV—IV indicated in FIG. 2, opening the view to the inside of the vehicle. It can be seen that the vehicle body comprises a frame structure 24, to which the hull 23 and the deck 21 are mounted. The footrests 19 are an integral part of the deck 21 and each of them is situated in a recess in the deck 21.

An internal combustion engine and gearbox assembly 25 is supported on the frame as well. This assembly 25 is best arranged in the middle of the vehicle, so that its center of gravity is perpendicularly above the center of gravity of the vehicle's footprint. In the straight direction of travel, the distance of the combustion engine and gearbox assembly 25 from the middle of the ground engaging lower runs 10 of the tracks does preferably not exceed 30% of their length. The same applies for the combustion engine alone if there is no gearbox or if a detached gearbox is used.

A transmission 26 which connects a shaft of the combustion engine to the drive wheels 7 of the tracks via a differential gearing 27 is shown as well. However, many other drive systems are conceivable: The combustion engine might drive a generator producing electricity, the drive wheels being driven by electromotors, or the combustion engine might drive a hydraulic pump, the drive wheels being driven by hydraulic motors, for example. The steering system requires means to control the differential speed between the two tracks. For each of the different drive technologies various steering systems for full-track vehicles are already known to the one skilled in the art.

Numerous variations of the described methods and embodiments are obvious for the one skilled in the art and the foregoing description shall not be construed as a limitation to the scope of the invention, which is solely defined by the following claims.

The invention claimed is:

1. A tracked ATV comprising:
   a vehicle body having a front end and a rear end defining a straight direction of travel;
   a pair of ground engaging endless tracks rotatably mounted around track wheels in parallel with the straight direction of travel and fully supporting the vehicle body, wherein;
   each of the tracks includes an upper run and a lower run ground-engaging run and the track wheels comprise support wheels supporting the upper run and carrying wheels supporting the body on the inner surface of the lower run of each of thee tracks;
   a suspension device resiliently suspending the carrying wheels from the body
   an internal combustion engine operably connected to the tracks for driving the tracks;
   a driver seat supported on the body;
   a speed control device operably connected to the tracks and operable to control common speed of the tracks for speed control;
   a steering device operably connected to the tracks to control steering of the vehicle by controlling differential speeds of the tracks, wherein:
   the steering device comprises a handlebar pivotally mounted to the body in front of the driver seat and operable to be turned left or right for left or right steering of the ATV respectively, and
   the speed control device is arranged on the handlebar for enabling manual speed control of the vehicle by a driver; and
   left and right footrests for the left and right foot of the driver respectively, provided behind the handlebar and situated between the tracks and vertically below the upper run of the tracks in a position allowing a standing driving posture of the driver.

2. A tracked ATV according to claim 1, further comprising a brake system comprising a brake control arranged on the handlebar for manual braking.

3. A tracked ATV according to claim 1, wherein the driver seat is a straddle seat and the footrests are provided left and right of the driver seat.

4. A tracked ATV according to claim 1, wherein the suspension device is operable to allow a vertical excursion of the carrying wheels with respect to the body of at least 10 cm.

5. A tracked ATV according to claim 1, wherein the resilient suspension device individually suspends each of the carrying wheels from the body.

6. A tracked ATV according to claim 1, wherein the length of the ground engaging lower run of the tracks does not exceed 2 m.

7. A tracked ATV according to claim 1, wherein unfueled weight of the ATV does not exceed 450 kg.

8. A tracked ATV according to claim 1, wherein the body comprises a watertight hull having a volume which is sufficient for the vehicle to float in water.

9. A tracked ATV according to claim 8, wherein the vehicle hull and its volume are such that the upper runs of the tracks of the vehicle are above a water when the vehicle is floating.

10. A tracked ATV according to claim 1, wherein the body comprises a substantially closed deck and each of the footrests is arranged in a corresponding recess in the deck.

11. A tracked ATV according to claim 1, wherein the combustion engine is mounted to the body in such a position that, in the straight direction of travel, the distance of the center of gravity of the ATV from the middle of the ground engaging lower run of the tracks does not exceed 30% of the length of the lower run.

12. A tracked ATV according to claim 1, wherein the driver seat is arranged in such a position that, in the straight direction of travel, the deviation of a sitting position of the driver from the middle of the ground engaging lower run of the tracks does not exceed 30% of the length of the lower run.

13. A tracked ATV comprising
   a vehicle body having a front end and a rear end defining a straight direction of travel;
   a pair of ground engaging endless tracks rotatably mounted around track wheels in parallel with the straight direction of travel and fully supporting the vehicle body; wherein:
   each of the tracks has an upper run and a lower ground engaging run; and
   the track wheels comprise support wheels supporting the upper run and carrying wheels supporting the body on an inner surface of the lower run of each of the tracks;
   a suspension device resiliently suspending the carrying wheels from the body;
   an internal combustion engine operably connected to the tracks for driving the tracks,
   a driver seat in the form of a straddle seat supported on the body;
   a speed control device and a steering device operably connected to the tracks and operable to control the common and differential speed of the tracks for speed control and steering of the vehicle respectively; and
   footrests for the feet of the driver arranged left and right of the driver seat, in positions between the two tracks and vertically between the upper run and the lower ground engaging run of the tracks.

14. A tracked ATV according to claim 13, further comprising left and right handles arranged on the body for left and right hands of a driver respectively, and the speed control device and the steering control device are arranged such that the driver can operate them with his hands on the handles.

15. A tracked ATV according to claim 14, wherein the steering device comprises at least one of the handles and is operable manually by the at least one handle.

16. A tracked ATV according to claim 14, wherein the speed control device is associated with one of the handles for manual speed control.

17. A tracked ATV according to claim 14, further comprising a brake system having a brake control arranged in proximity to at least one of the handles and the brake control is operable for manual braking.

18. A tracked ATV according to claim 14, wherein the handles are arranged in an essentially horizontal plane.

19. A tracked ATV according to claim 14, wherein the steering device is a handlebar mounted to the body in front of the driver seat, and the left and right handles are arranged on the handlebar.

20. A tracked ATV according to claim 19, wherein the handlebar is pivotally mounted to the body and is arranged to be operated by turning the handlebar left or right for left or right steering respectively.

21. A tracked ATV according to claim 13, wherein the suspension device is operable to allow a vertical excursion of the carrying wheels with respect to the body of at least 10 cm.

22. A tracked ATV according to claim 13, wherein the resilient suspension device individually suspends each of the carrying wheels from the body.

23. A tracked ATV according to claim 13, wherein
the length of the ground engaging lower runs of the tracks does not exceed 2 m.

24. A tracked ATV according to claim 13, wherein unfueled weight of the ATV does not exceed 450 kg.

25. A tracked ATV according to claim 13, wherein the body comprises a watertight hull having a volume which is sufficient for the vehicle to float in water.

26. A tracked ATV according to claim 24, wherein the vehicle hull and its volume are such that the upper run of the tracks of the vehicle is above water when the vehicle is floating.

27. A tracked ATV according to claim 13, wherein the body comprises a substantially closed deck and each of the footrests is arranged in a corresponding recess in the deck.

28. A tracked ATV according to claim 13, wherein
the engine is mounted to the body in such a position that, in the straight direction of travel, the distance of the center of gravity of the ATV from the middle of the ground engaging lower run of the tracks does not exceed 30% of the length of the lower run.

29. A tracked ATV according to claim 13, wherein
the driver seat is arranged in such a position that, in the straight direction of travel, the deviation of a sitting position of the driver from the middle of the ground engaging lower run of the tracks does not exceed 30% of the length of the lower run.

30. A tracked ATV comprising:
a vehicle body having a front end and a rear end defining a straight direction of travel;
a pair of ground engaging endless tracks rotatably mounted around track wheels in parallel with the straight direction of travel and fully supporting the vehicle body, each of the tracks including an upper run and a lower ground engaging run;
the track wheels including support wheels supporting the upper run, carrying wheels supporting the body on the inner surface of the lower run of each of the tracks, and a suspension device resiliently suspending the carrying wheels from the body;
an internal combustion engine operably connected to the tracks for driving the tracks;
a driver seat supported on the body;
a speed control device operably connected to the tracks and operable to control common speed of the tracks for speed control;
a steering device operably connected to the tracks to control steering of the vehicle by controlling differential speeds of the tracks,
the steering device comprising
a handlebar pivotally mounted to the body in front of the driver seat and operable to be turned left or right for left or right steering of the ATV respectively, and
the speed control device is arranged on the handlebar for enabling manual speed control of the vehicle by a driver; and
left and right footrests for the left and right foot of the driver respectively, provided behind the handlebar and situated between the tracks and vertically below the upper run of the tracks in a position allowing a standing driving posture of the driver.

* * * * *